(12) United States Patent
Yamada et al.

(10) Patent No.: US 11,112,920 B2
(45) Date of Patent: Sep. 7, 2021

(54) INPUT DEVICE AND IMAGE DATA CALCULATION METHOD

(71) Applicant: ALPS ALPINE CO., LTD., Tokyo (JP)

(72) Inventors: Tomoki Yamada, Miyagi (JP); Tatsumi Fujiyoshi, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/243,447

(22) Filed: Jan. 9, 2019

(65) Prior Publication Data

US 2019/0146612 A1  May 16, 2019

Related U.S. Application Data

(63) Continuation of application No. PCT/JP2017/009687, filed on Mar. 10, 2017.

(30) Foreign Application Priority Data

Jul. 15, 2016 (JP) .............................. JP2016-140933

(51) Int. Cl.
*G06F 3/044* (2006.01)

(52) U.S. Cl.
CPC .................................. *G06F 3/0446* (2019.05)

(58) Field of Classification Search
CPC ........ G06F 3/041; G06F 3/044; G06F 3/0418; G06F 2203/04106; G06F 2203/04108; G06F 2203/04104
See application file for complete search history.

(56) References Cited

U.S. PATENT DOCUMENTS

| 2011/0279169 | A1* | 11/2011 | Salaverry | G06F 3/0416 327/517 |
|---|---|---|---|---|
| 2012/0026126 | A1 | 2/2012 | Park et al. | |
| 2012/0200512 | A1 | 8/2012 | Olivier | |
| 2014/0292676 | A1 | 10/2014 | Hayashi et al. | |
| 2015/0138134 | A1* | 5/2015 | Kim | G06F 3/044 345/174 |

FOREIGN PATENT DOCUMENTS

| JP | 2012-027889 | 2/2012 |
|---|---|---|
| JP | 2014-504769 | 2/2014 |
| JP | 2014-199492 | 10/2014 |

OTHER PUBLICATIONS

International Search Report dated Apr. 4, 2017 in PCT/JP2017/009687 filed on Mar. 10, 2017.

* cited by examiner

*Primary Examiner* — Shaheda A Abdin
(74) *Attorney, Agent, or Firm* — IPUSA, PLLC

(57) ABSTRACT

An input device includes at least one electrode including multiple detection terminals. The detection terminals are connected to an image data calculation unit. The image data calculation unit detects detection values that vary in accordance with an amount of electric charge detected through the detection terminals. Based on coefficient information values, the image data calculation unit calculates image data values each corresponding to capacitance of each of multiple sections. The coefficient information corresponds to different combinations of one of the multiple sections and one of the multiple detection terminals. The coefficient information represents a ratio of electric charge detected by the one of the detection terminals to an amount of electric charge charged in one of the sections.

10 Claims, 11 Drawing Sheets

| HORIZONTAL AREA RATIO TABLE | | | | | |
|---|---|---|---|---|---|
|  | xa | xb | xc | xd | xe |
| ya | 0.5 | 0.5 | 0.5 | 0.5 | 0.5 |
| yb | 0.5 | 0.5 | 0.5 | 0.5 | 0.5 |
| yc | 0.5 | 0.5 | 0.5 | 0.5 | 0.5 |
| yd | 0.5 | 0.5 | 0.5 | 0.5 | 0.5 |

×

162L

| LEFT RESISTANCE RATIO TABLE | | | | | |
|---|---|---|---|---|---|
|  | xa | xb | xc | xd | xe |
| ya | 1 | 0.75 | 0.5 | 0.25 | 0 |
| yb | 1 | 0.75 | 0.5 | 0.25 | 0 |
| yc | 1 | 0.75 | 0.5 | 0.25 | 0 |
| yd | 1 | 0.75 | 0.5 | 0.25 | 0 |

=

163L

| LEFT COEFFICIENT TABLE | | | | | |
|---|---|---|---|---|---|
|  | xa | xb | xc | xd | xe |
| ya | 0.5 | 0.38 | 0.25 | 0.13 | 0 |
| yb | 0.5 | 0.38 | 0.25 | 0.13 | 0 |
| yc | 0.5 | 0.38 | 0.25 | 0.13 | 0 |
| yd | 0.5 | 0.38 | 0.25 | 0.13 | 0 |

| HORIZONTAL AREA RATIO TABLE | | | | | |
|---|---|---|---|---|---|
| | xa | xb | xc | xd | xe |
| ya | 0.5 | 0.5 | 0.5 | 0.5 | 0.5 |
| yb | 0.5 | 0.5 | 0.5 | 0.5 | 0.5 |
| yc | 0.5 | 0.5 | 0.5 | 0.5 | 0.5 |
| yd | 0.5 | 0.5 | 0.5 | 0.5 | 0.5 |

×

162R

| RIGHT RESISTANCE RATIO TABLE | | | | | |
|---|---|---|---|---|---|
| | xa | xb | xc | xd | xe |
| ya | 0 | 0.25 | 0.5 | 0.75 | 1 |
| yb | 0 | 0.25 | 0.5 | 0.75 | 1 |
| yc | 0 | 0.25 | 0.5 | 0.75 | 1 |
| yd | 0 | 0.25 | 0.5 | 0.75 | 1 |

=

163R

| RIGHT COEFFICIENT TABLE | | | | | |
|---|---|---|---|---|---|
| | xa | xb | xc | xd | xe |
| ya | 0 | 0.13 | 0.25 | 0.38 | 0.5 |
| yb | 0 | 0.13 | 0.25 | 0.38 | 0.5 |
| yc | 0 | 0.13 | 0.25 | 0.38 | 0.5 |
| yd | 0 | 0.13 | 0.25 | 0.38 | 0.5 |

| VERTICAL AREA RATIO TABLE | | | | | |
|---|---|---|---|---|---|
| | xa | xb | xc | xd | xe |
| ya | 0.5 | 0.5 | 0.5 | 0.5 | 0.5 |
| yb | 0.5 | 0.5 | 0.5 | 0.5 | 0.5 |
| yc | 0.5 | 0.5 | 0.5 | 0.5 | 0.5 |
| yd | 0.5 | 0.5 | 0.5 | 0.5 | 0.5 |

×

162T

| UPPER RESISTANCE RATIO TABLE | | | | | |
|---|---|---|---|---|---|
| | xa | xb | xc | xd | xe |
| ya | 1 | 1 | 1 | 1 | 1 |
| yb | 0.66 | 0.66 | 0.66 | 0.66 | 0.66 |
| yc | 0.34 | 0.34 | 0.34 | 0.34 | 0.34 |
| yd | 0 | 0 | 0 | 0 | 0 |

=

163T

| UPPER COEFFICIENT TABLE | | | | | |
|---|---|---|---|---|---|
| | xa | xb | xc | xd | xe |
| ya | 0.5 | 0.5 | 0.5 | 0.5 | 0.5 |
| yb | 0.33 | 0.33 | 0.33 | 0.33 | 0.33 |
| yc | 0.17 | 0.17 | 0.17 | 0.17 | 0.17 |
| yd | 0 | 0 | 0 | 0 | 0 |

| VERTICAL AREA RATIO TABLE | | | | | |
|---|---|---|---|---|---|
| | xa | xb | xc | xd | xe |
| ya | 0.5 | 0.5 | 0.5 | 0.5 | 0.5 |
| yb | 0.5 | 0.5 | 0.5 | 0.5 | 0.5 |
| yc | 0.5 | 0.5 | 0.5 | 0.5 | 0.5 |
| yd | 0.5 | 0.5 | 0.5 | 0.5 | 0.5 |

×

162B

| LOWER RESISTANCE RATIO TABLE | | | | | |
|---|---|---|---|---|---|
| | xa | xb | xc | xd | xe |
| ya | 0 | 0 | 0 | 0 | 0 |
| yb | 0.34 | 0.34 | 0.34 | 0.34 | 0.34 |
| yc | 0.66 | 0.66 | 0.66 | 0.66 | 0.66 |
| yd | 1 | 1 | 1 | 1 | 1 |

=

163B

| LOWER COEFFICIENT TABLE | | | | | |
|---|---|---|---|---|---|
| | xa | xb | xc | xd | xe |
| ya | 0 | 0 | 0 | 0 | 0 |
| yb | 0.17 | 0.17 | 0.17 | 0.17 | 0.17 |
| yc | 0.33 | 0.33 | 0.33 | 0.33 | 0.33 |
| yd | 0.5 | 0.5 | 0.5 | 0.5 | 0.5 |

FIG.10

| | L1 | L2 | L3 | L4 | R1 | R2 | R3 | R4 | T1 | T2 | T3 | T4 | T5 | B1 | B2 | B3 | B4 | B5 |
|---|---|---|---|---|---|---|---|---|---|---|---|---|---|---|---|---|---|---|
| | 4 | 18 | 21 | 50 | 12 | 54 | 19 | 14 | 1.7 | 5 | 17 | 60 | 13 | 28 | 50 | 28 | 30 | 6.7 |

174  $=S_C$

| | L1 | L2 | L3 | L4 | R1 | R2 | R3 | R4 | T1 | T2 | T3 | T4 | T5 | B1 | B2 | B3 | B4 | B5 |
|---|---|---|---|---|---|---|---|---|---|---|---|---|---|---|---|---|---|---|
| | 5 | 23 | 26 | 63 | 15 | 68 | 24 | 18 | 1.7 | 5 | 17 | 60 | 13 | 28 | 50 | 28 | 30 | 6.7 |

173  $=S$

| | L1 | L2 | L3 | L4 | R1 | R2 | R3 | R4 | T1 | T2 | T3 | T4 | T5 | B1 | B2 | B3 | B4 | B5 |
|---|---|---|---|---|---|---|---|---|---|---|---|---|---|---|---|---|---|---|
| | 1.3 | 1.3 | 1.3 | 1.3 | 1.3 | 1.3 | 1.3 | 1.3 | 1 | 1 | 1 | 1 | 1 | 1 | 1 | 1 | 1 | 1 |

172  $=S_0$

171

| | |
|---|---|
| (xa, ya) | 1 |
| (xb, ya) | 1 |
| (xc, ya) | 1 |
| (xd, ya) | 1 |
| (xe, ya) | 1 |
| (xa, yb) | 1 |
| (xb, yb) | 1 |
| (xc, yb) | 1 |
| (xd, yb) | 1 |
| (xe, yb) | 1 |
| (xa, yc) | 1 |
| (xb, yc) | 1 |
| (xc, yc) | 1 |
| (xd, yc) | 1 |
| (xe, yc) | 1 |
| (xa, yd) | 1 |
| (xb, yd) | 1 |
| (xc, yd) | 1 |
| (xd, yd) | 1 |
| (xe, yd) | 1 |

$=Z_0$

175

| | |
|---|---|
| (xa, ya) | 2.8 |
| (xb, ya) | 5.5 |
| (xc, ya) | 12 |
| (xd, ya) | 35 |
| (xe, ya) | 13 |
| (xa, yb) | 14 |
| (xb, yb) | 24 |
| (xc, yb) | 28 |
| (xd, yb) | 48 |
| (xe, yb) | 33 |
| (xa, yc) | 20 |
| (xb, yc) | 28 |
| (xc, yc) | 22 |
| (xd, yc) | 30 |
| (xe, yc) | 14 |
| (xa, yd) | 39 |
| (xb, yd) | 46 |
| (xc, yd) | 30 |
| (xd, yd) | 27 |
| (xe, yd) | 10 |

$=Z_C$

176

| | |
|---|---|
| (xa, ya) | 2.8 |
| (xb, ya) | 5.5 |
| (xc, ya) | 12 |
| (xd, ya) | 35 |
| (xe, ya) | 13 |
| (xa, yb) | 14 |
| (xb, yb) | 24 |
| (xc, yb) | 28 |
| (xd, yb) | 48 |
| (xe, yb) | 33 |
| (xa, yc) | 20 |
| (xb, yc) | 28 |
| (xc, yc) | 22 |
| (xd, yc) | 30 |
| (xe, yc) | 14 |
| (xa, yd) | 39 |
| (xb, yd) | 46 |
| (xc, yd) | 30 |
| (xd, yd) | 27 |
| (xe, yd) | 10 |

$=Z$

INPUT DEVICE AND IMAGE DATA CALCULATION METHOD

CROSS-REFERENCE TO RELATED APPLICATIONS

This application is a continuation of International Application No. PCT/JP2017/009687 filed on Mar. 10, 2017 and designated the U.S., which claims priority to Japanese Patent Application No. 2016-140933 filed on Jul. 15, 2016. The contents of these applications are incorporated herein by reference in their entirety.

BACKGROUND OF THE INVENTION

1. Field of the Invention

The present disclosure relates to an input device and an image data calculation method.

2. Description of the Related Art

Conventionally, there is known a capacitive input device having a flat operation panel, which is configured to detect a position on the operation panel touched by an operating body (such as a finger or a stylus), as disclosed in Patent Document 1. Inside the input device disclosed in Patent Document 1, multiple electrodes are arranged two-dimensionally along an operation panel, at a location spaced from the operation panel. The input device disclosed in Patent Document 1 obtains, for each of the electrodes, image data corresponding to a variation of capacitance between an operating body and the electrode, to detect a two-dimensional location where the operating body is touching.

However, in the input device disclosed in Patent Document 1, in order to generate image data corresponding to various measuring locations on a two-dimensional area, a number of electrodes of the same number of the measuring locations are required. As the number of electrodes increases, the number of input terminals for a detecting circuit for detecting capacitance increases, and thereby causes a problem that a size of the input device becomes larger. In addition, in a case in which a large number of input terminals are provided in the input device, if capacitance is to be measured precisely, a time required for measurement and the number of measurements becomes large. Conversely, if capacitance is to be measured in a short time, preciseness of the measurement degrades.

The present invention is made in light of the above problem, and aims at providing an input device capable of precisely generating image data representing a variation of capacitance between each location on an operation panel and an operating body, with a small number of electrodes.

PATENT DOCUMENT

[Patent Document 1] Japanese Laid-open Patent Publication No. 2012-027889

SUMMARY OF THE INVENTION

According to an aspect of the present disclosure, there is provision of an input device including an operation panel configured to receive an operation by at least one operating body located close to the operation panel; at least one electrode including multiple detection terminals, which is arranged along the operation panel and spaced from the operation panel; and an image data calculation unit connected to the multiple detection terminals, which is configured to calculate image data values each corresponding to one of multiple sections defined on the operation panel virtually. In each of the multiple sections, at least part of the electrode is arranged in proximity to part of the operation panel. Each of the image data values varies in accordance with an amount of electric charge charged in a corresponding section of the multiple sections by a capacitance between the electrode and the at least one operating body. The image data calculation unit is configured to detect, for each of the detection terminals, a detection value varying in accordance with an amount of electric charge detected through a corresponding detection terminal of the detection terminals, and to calculate the image data values based on multiple coefficient information values. Each of the coefficient information values corresponds to one set of different sets of one of the sections and one of the detection terminals, and the each of the coefficient information values represents a ratio of an amount of electric charge detected through the detection terminal of the one set to an amount of electric charge charged in the section of the one set.

BRIEF DESCRIPTION OF THE DRAWINGS

FIG. 5 is a diagram illustrating a process for calculating the coefficient information values in FIG. 4 related to left detection terminals;

FIG. 6 is a diagram illustrating a process for calculating the coefficient information values in FIG. 4 related to right detection terminals;

FIG. 7 is a diagram illustrating a process for calculating the coefficient information values in FIG. 4 related to top detection terminals;

FIG. 8 is a diagram illustrating a process for calculating the coefficient information values in FIG. 4 related to bottom detection terminals;

FIG. 10 is a diagram illustrating examples of matrices that are calculated or used by the image data calculating method illustrated in FIG. 9.

DETAILED DESCRIPTION OF THE PREFERRED EMBODIMENTS (Overall Configuration)

Figure 1:
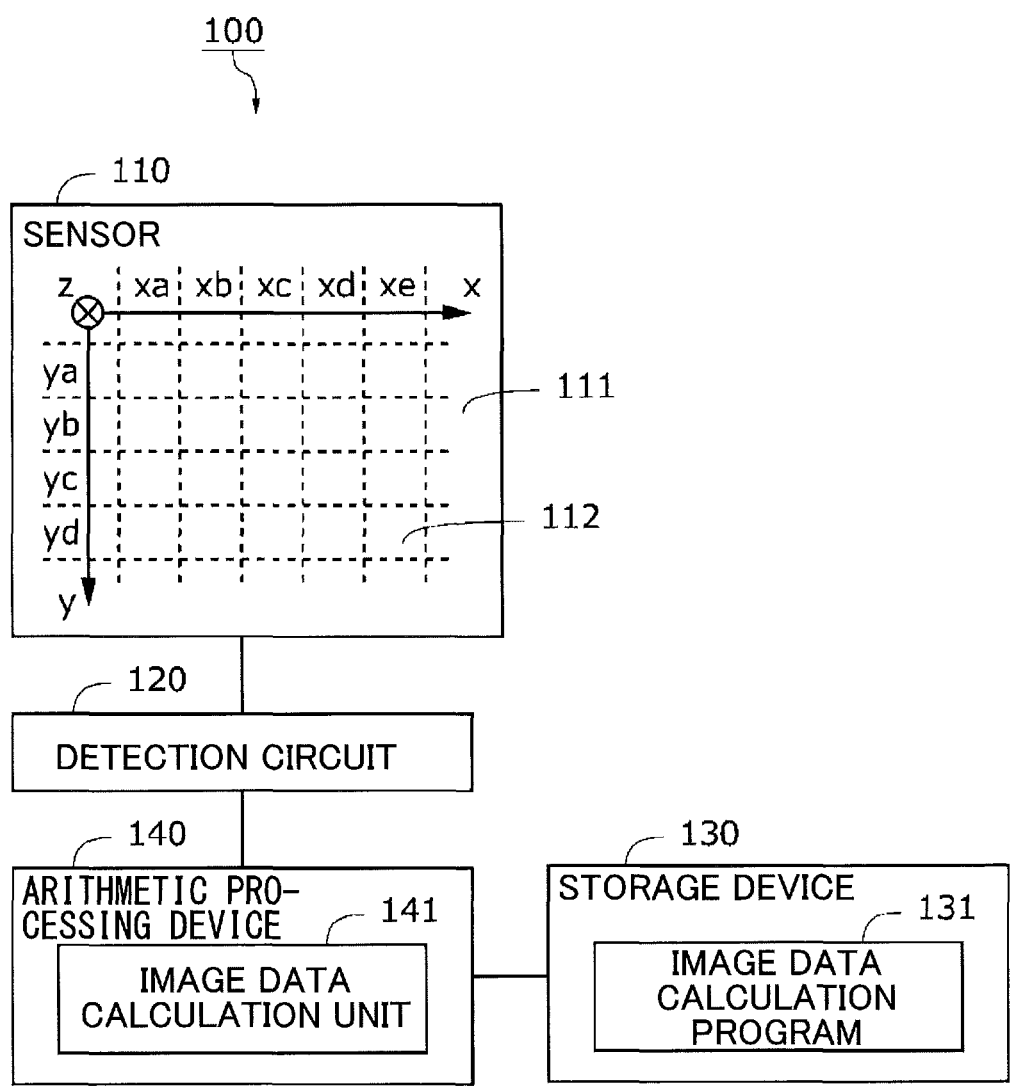
FIG. 1 is a diagram of an input device according to an embodiment.

In the following, an input device according to an embodiment of the present disclosure will be described. FIG. 1 is a schematic diagram of the input device 100 according to the present embodiment. The input device 100 is installed in an external device such as a personal computer. For each of coordinates on a two-dimensional surface, the input device 100 generates image data that varies in accordance with a degree of proximity of at least one operating body (such as a finger of a human or a stylus). By using the image data, the input device 100 or the external device detects the number of the operating bodies, positions of the operating bodies, and trajectories of the operating bodies, for example. The input device 100 includes a sensor 110, a detection circuit 120, a storage device 130 (may also be referred to as a memory device), and an arithmetic processing device 140 (may also be referred to as a processor or a central processing unit (CPU)).

In the present specification, in order to express a direction, an x-direction, a y-direction, and a z-direction, which are orthogonal to each other, are defined. Instead of the x-direction, the y-direction, and the z-direction, expressions of upper (or top), lower (or bottom), left, and right may be used. However, because the above words are used for illustrating a relative positional relationship between each object, they do not necessarily express actual directions when the input device is actually used. Also, a shape of each element is not limited to the exact geometric form described in the specification, regardless of whether or not a word of "substantially" is attached to a word describing a shape of an element described in the specification, as long as a technical idea of the embodiment disclosed in the present specification can be realized.

(Sensor)

The sensor 110 includes an operation panel 111 extending in parallel with an xy-plane. The operation panel 111 receives an operation from at least one operating body positioned close to the operation panel 111.

On the operation panel 111, multiple sections 112 are virtually defined. When seen in the z-direction, each of the sections 112 has the same shape, which is of a substantially rectangular area having two edges extending in the x-direction and having two edges extending in the y-direction. Each of the sections 112 extends in the z-direction. A total of 20 of the sections 112 are arranged, like a matrix, 5 by 4 in x and y directions. X coordinates of the five sections 112 arranged in the x-direction are, from a negative side (left side in the drawing) to a positive side (right side in the drawing) in the x-direction, xa, xb, xc, xd, and xe. Y coordinates of the four sections 112 arranged in the y-direction are, from a negative side (upper side in the drawing) to a positive side (lower side in the drawing) in the y-direction, ya, yb, yc, and yd. Although a reference symbol (112) is attached to only the section 112 of the coordinates (xe, yd) in FIG. 1, every section corresponding to the 20 coordinates is referred to as the section 112.

Figure 2:
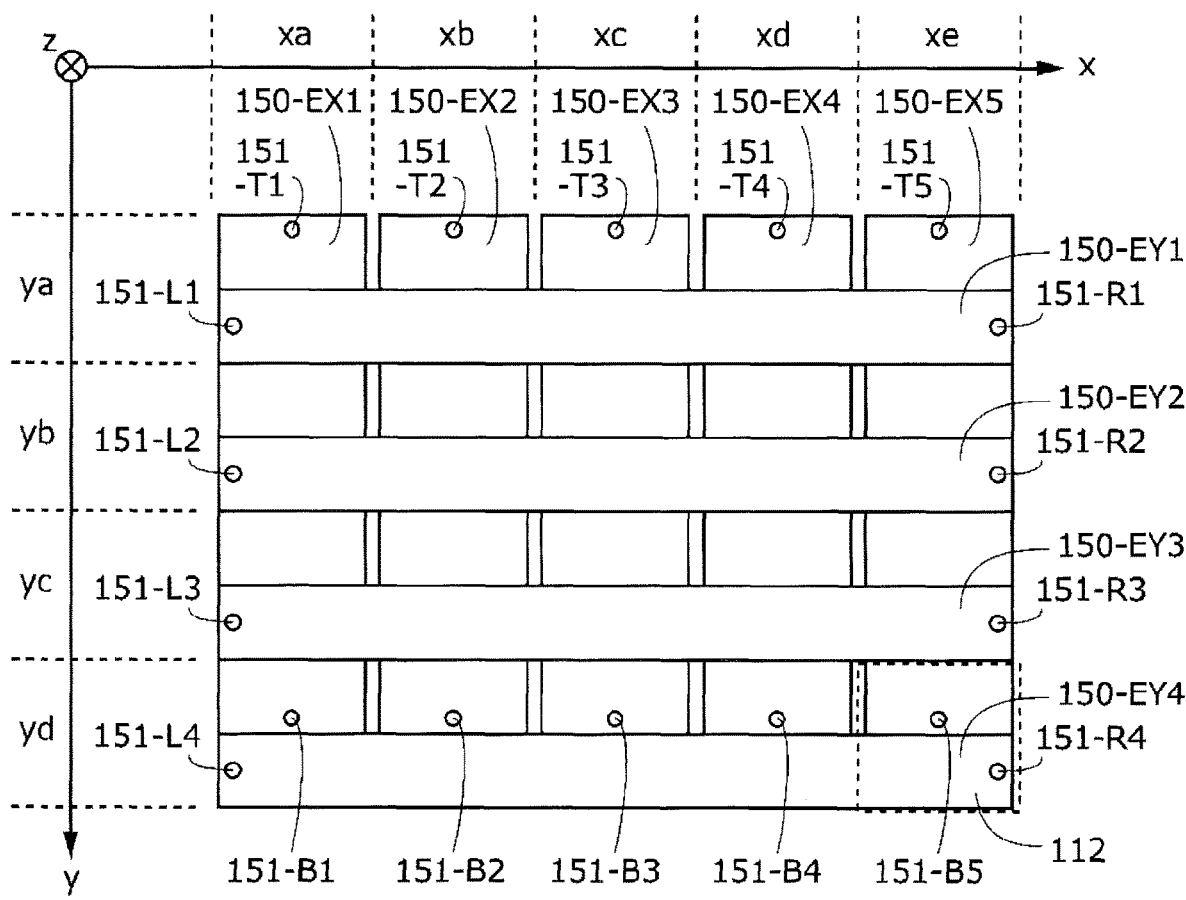
FIG. 2 is a plan view of electrodes of a sensor illustrated in FIG. 1.

The sensor 110 illustrated in FIG. 1 includes a first horizontal electrode 150-EY1, a second horizontal electrode 150-EY2, a third horizontal electrode 150-EY3, a fourth horizontal electrode 150-EY4 (each of which may be referred to as a "horizontal electrode 150-EY" when they are not distinguished), and a first vertical electrode 150-EX1, a second vertical electrode 150-EX2, a third vertical electrode 150-EX3, a fourth vertical electrode 150-EX4, and a fifth vertical electrode 150-EX5 (each of which may be referred to as a "vertical electrode 150-EX" when they are not distinguished), as illustrated in FIG. 2. In the following, when the horizontal electrode 150-EY and the vertical electrode 150-EX are not distinguished, each of them may be referred to as an "electrode 150". The number of electrodes 150 is not limited to the number described in the present embodiment, and only one electrode 150 can reside in the sensor 110. All the electrodes 150 are arranged along the operation panel 111, which are spaced from the operation panel 111.

(Horizontal Electrode)

The horizontal electrode 150-EY is a planar conductor (such as metal thin film) extending in parallel with the xy-plane. A thickness of the horizontal electrode 150-EY is uniform in the z-direction, and is extremely small as compared to a length of the horizontal electrode 150-EY in the x-direction or a width of the horizontal electrode 150-EY in the y-direction. When seen in the z-direction, the horizontal electrode 150-EY is a rectangle having two parallel edges extending in the x-direction and having two parallel edges extending in the y-direction. The length of the horizontal electrode 150-EY in the x-direction is greater than the width of the horizontal electrode 150-EY in the y-direction. The four horizontal electrodes 150-EY have a configuration of being shifted parallel with respect to each other in the y-direction. The horizontal electrodes 150-EY are equally spaced from each other. A resistance per unit length of the horizontal electrode 150-EY in the x-direction is uniform regardless of a position.

The first horizontal electrode 150-EY1 has a first left detection terminal 151-L1 at its end of the negative side in the x-direction, and has a first right detection terminal 151-R1 at its end of the positive side in the x-direction. Similarly, the second horizontal electrode 150-EY2, the third horizontal electrode 150-EY3, and the fourth horizontal electrode 150-EY4, have a second left detection terminal 151-L2, a third left detection terminal 151-L3, and a fourth left detection terminal 151-L4 respectively at their end of the negative side in the x-direction, and have a second right detection terminal 151-R2, a third right detection terminal 151-R3, and a fourth right detection terminal 151-R4 respectively at their end of the positive side in the x-direction.

In the following, when the first to fourth left detection terminals 151-L1 to 151-L4 are not distinguished, each of them may be referred to as a left detection terminal 151-L. Each of the left detection terminals 151-L is arranged at a middle point of the corresponding horizontal electrode 150-EY in the y-direction. In the following, when the first to fourth right detection terminals 151-R1 to 151-R4 are not distinguished, each of them may be referred to as a right detection terminal 151-R. Each of the right detection terminals 151-R is arranged at a middle point of the corresponding horizontal electrode 150-EY in the y-direction. Each of the horizontal electrodes 150-EY is electrically connected to the detection circuit 120 illustrated in FIG. 1, via the corresponding left detection terminal 151-L and the corresponding right detection terminal 151-R.

(Vertical Electrode)

Figure 3:
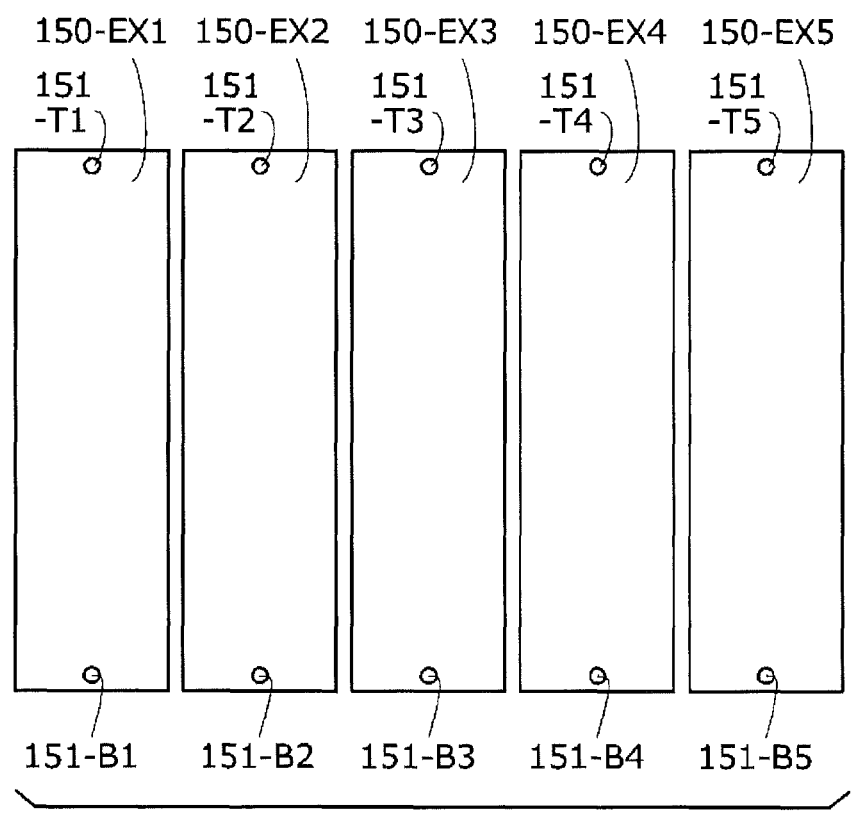
FIG. 3 is a plan view of vertical electrodes illustrated in FIG. 2.

FIG. 3 is a plan view of the vertical electrodes 150-EX. The vertical electrode 150-EX is a planar conductor (such as metal thin film) extending in parallel with the xy-plane. A thickness of the vertical electrode 150-EX is uniform in the z-direction, and is extremely small as compared to a width of the vertical electrode 150-EX in the x-direction or a length of the vertical electrode 150-EX in the y-direction. When seen in the z-direction, the vertical electrode 150-EX is a rectangle having two parallel edges extending in the x-direction and having two parallel edges extending in the y-direction. The width of the vertical electrode 150-EX in the x-direction is smaller than the length of the vertical electrode 150-EX in the y-direction. The five vertical electrodes 150-EX have a configuration of being shifted parallel with respect to each other in the x-direction. The vertical electrodes 150-EX are equally spaced from each other. A resistance per unit length of the vertical electrode 150-EX in the Y-direction is uniform regardless of a position.

The first vertical electrode 150-EX1 has a first top detection terminal 151-T1 at its end of the negative side in the y-direction, and has a first bottom detection terminal 151-B1 at its end of the positive side in the y-direction. Similarly, the second vertical electrode 150-EX2, the third vertical electrode 150-EX3, the fourth vertical electrode 150-EX4, and the fifth vertical electrode 150-EX5, have a second top detection terminal 151-T2, a third top detection terminal 151-T3, a fourth top detection terminal 151-T4 and a fifth top detection terminal 151-T5 respectively at their end of the negative side in the y-direction, and have a second bottom detection terminal 151-B2, a third bottom detection terminal 151-B3, a fourth bottom detection terminal 151-B4, and a fifth bottom detection terminal 151-B5 respectively at their end of the positive side in the y-direction.

In the following, when the first to fifth top detection terminals 151-T1 to 151-T5 are not distinguished, each of them may be referred to as a top detection terminal 151-T. Each of the top detection terminals 151-T is arranged at a middle point of the corresponding vertical electrode 150-EX in the x-direction. In the following, when the first to fifth bottom detection terminals 151-B1 to 151-B5 are not distinguished, each of them may be referred to as a bottom detection terminal 151-B. Each of the bottom detection terminals 151-B is arranged at a middle point of the corresponding vertical electrode 150-EX in the x-direction. Each of the vertical electrodes 150-EX is electrically connected to the detection circuit 120 illustrated in FIG. 1, via the corresponding top detection terminal 151-T and the corresponding bottom detection terminal 151-B.

(Horizontal Electrode and Vertical Electrode)

The horizontal electrode 150-EY illustrated in FIG. 2 is spaced from the vertical electrode 150-EX illustrated in FIG. 2 at a predetermined distance in the z-direction. The horizontal electrode 150-EY is positioned between the vertical electrode 150-EX and the operation panel 111 (FIG. 1). The entirety of the horizontal electrode 150-EY directly faces the operation panel 111. Conversely, the vertical electrode 150-EX has a portion that directly faces the operation panel 111 and a portion that is shielded by the horizontal electrode 150-EY in the z-direction.

Length of the horizontal electrode 150-EY in the x-direction is approximately equal to a width of the entirety of the five vertical electrodes 150-EX. An edge of the vertical electrode 150-EX on the negative side in the y-direction is located further in the negative direction than an edge of the first horizontal electrode 150-EY1 on the negative side in the y-direction. An edge of the vertical electrode 150-EX on the positive side in the y-direction is located at substantially the same location as that of the fourth horizontal electrode 150-EY4 on the positive side in the y-direction. A gap between the vertical electrodes 150-EX is extremely smaller than a gap between the horizontal electrodes 150-EY.

(Section)

The first horizontal electrode 150-EY1 (FIG. 2) passes through the five sections 112 (FIG. 1) each having a y coordinate of ya. The second horizontal electrode 150-EY2 (FIG. 2) passes through the five sections 112 (FIG. 1) each having a y coordinate of yb. The third horizontal electrode 150-EY3 (FIG. 2) passes through the five sections 112 (FIG. 1) each having a y coordinate of yc. The fourth horizontal electrode 150-EY4 (FIG. 2) passes through the five sections 112 (FIG. 1) each having a y coordinate of yd.

The first vertical electrode 150-EX1 (FIG. 2) passes through the four sections 112 (FIG. 1) each having an x coordinate of xa. The second vertical electrode 150-EX2 (FIG. 2) passes through the four sections 112 (FIG. 1) each having an x coordinate of xb. The third vertical electrode 150-EX3 (FIG. 2) passes through the four sections 112 (FIG. 1) each having an x coordinate of xc. The fourth vertical electrode 150-EX4 (FIG. 2) passes through the four sections 112 (FIG. 1) each having an x coordinate of xd. The fifth vertical electrode 150-EX5 (FIG. 2) passes through the four sections 112 (FIG. 1) each having an x coordinate of xe.

As illustrated in FIG. 2, in each of the sections 112, at least part of at least one of the electrodes 150 is arranged in proximity to part of the operation panel 111 (FIG. 1). When focusing on one section 112, as illustrated in FIG. 2, on one half area of the section 112 at the positive side in the y-direction, the horizontal electrode 150-EY faces the operation panel 111, and the vertical electrode 150-EX faces the operation panel 111 on the other half area of the section 112 at the negative side in the y-direction. When an operating body approaches the electrode 150, capacitance between the operating body and the electrode 150 varies in accordance with a degree of proximity of the operating body. In an area in which the horizontal electrode 150-EY is provided between the vertical electrode 150-EX and the operation panel 111, only the horizontal electrode 150-EY, which is the closer to the operating body, contributes to a variation of the capacitance of the section 112. In one section 112, an area of the horizontal electrode 150-EY contributing to a variation of the capacitance and an area of the vertical electrode 150-EX contributing to a variation of the capacitance are approximately the same.

(Detection Circuit 120)

The detection circuit 120 illustrated in FIG. 1 detects an amount of electric charge that varies depending on capacitance between an operating body and the electrode 150, from each of the detection terminals 151 (FIG. 2). The detection circuit 120 detects an amount of electric charge using the same principle as that used in a conventional self-capacitance type input device. However, the detection circuit 120 according to the present embodiment detects electric charge which has been charged by capacitance between an electrode 150 (illustrated in FIG. 2) and an operating body, through two detection terminals 151 separately. The detection circuit 120 performs detection of an amount of electric charge in two detection terminals 151 simultaneously. With respect to electric charge charged in a section 112 of the electrode 150, because the electrode 150 includes resistance, more electric charge can be detected from the detection terminal 151 that is closer to the section 112 than the detection terminal 151 that is not closer to the section 112.

(Storage Device)

The storage device 130 illustrated in FIG. 1 stores an image data calculation program 131. The image data calculation program 131 is read out by the arithmetic processing device 140, and causes the arithmetic processing device 140 to embody a function for performing a part of an image data calculation method or to embody other functions. When the arithmetic processing device 140 performs various functions, the storage device 130 properly stores necessary information by control of the arithmetic processing device 140. The storage device 130 is a non-transitory tangible recording medium. The storage device 130 includes a read-only memory (ROM) or a random access memory (RAM). The storage device 130 is a volatile or nonvolatile recording medium. The storage device 130 may be removable, or may not be removable.

(Arithmetic Processing Device)

The arithmetic processing device 140 serves as an image data calculation unit 141 by reading out the image data calculation program 131 and executing the image data calculation program 131. The arithmetic processing device 140 according to the present embodiment is a general-purpose computer. However, the arithmetic processing device 140 may be an application specific integrated circuit (ASIC), or may be another circuit capable of implementing functions to be described in the present embodiment.

(Image Data Calculation Unit)

All the detection terminals 151 illustrated in FIG. 2 are connected to the image data calculation unit 141 via the detection circuit 120 illustrated in FIG. 1. For each of the detection terminals 151, the image data calculation unit 141 illustrated in FIG. 1 detects a detection value based on an amount of electric charge detected through the corresponding detection terminal 151. The detection value varies in accordance with change of an amount of electric charge. In the present embodiment, the detection value is a positive value that varies in proportion to an absolute value of an amount of electric charge detected through the detection terminal 151.

For each of the sections 112, the image data calculation unit 141 calculates a corresponding image data value. For each of the sections 112, the corresponding image data value varies depending on an amount of electric charge charged by capacitance between the two electrodes 150 (FIG. 2) and at least one operating body. In the present embodiment, the image data value is a positive value that varies in proportion to an absolute value of an amount of electric charge charged in a section 112. The image data calculation unit 141 calculates the image data values by performing an image data calculation method to be described below, based on coefficient information values.

(Coefficient Information)

Figure 4:
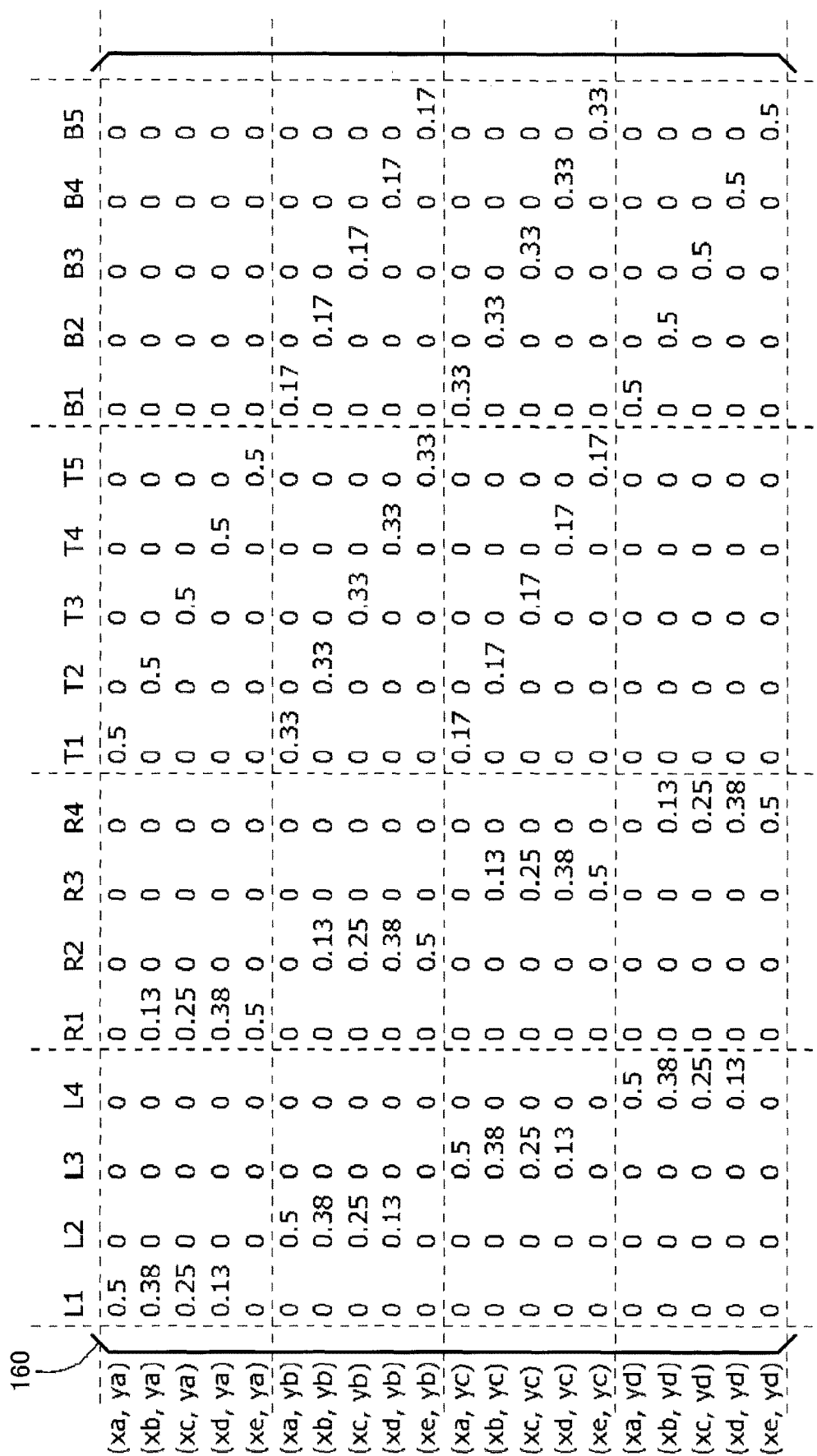
FIG. 4 is a diagram illustrating a coefficient matrix A consisting of coefficient information values used by the input device illustrated in FIG. 1.

A coefficient matrix A 160 illustrated in FIG. 4 is a matrix consisting of the coefficient information values. In a case in which the number of the sections 112 is denoted as n (n=20 in the present embodiment), the number of the detection terminals 151 is denoted as m (m=18 in the present embodiment), p is an integer not smaller than 1 and not larger than n, and k is an integer not smaller than 1 and not larger than m, the coefficient matrix A 160 is represented as a matrix with n rows and m columns consisting of the coefficient information values. For all p and all k, an entry in a p-th row and k-th column of the coefficient matrix A 160 represents a ratio of an amount of electric charge detected by the detection terminal 151 (FIG. 2) corresponding to the k-th column to an amount of electric charge charged in the section 112 corresponding to the p-th row.

Each row in the coefficient matrix A 160 illustrated in FIG. 4 corresponds to a section 112 corresponding to coordinates described at a left end of the corresponding row in the coefficient matrix A 160. Each column in the coefficient matrix A 160 corresponds to a detection terminal 151 (FIG. 2) corresponding to a symbol described at a top of the corresponding column in the coefficient matrix A 160. Note that each of the symbols described above the coefficient matrix A 160 in FIG. 4 represents the last two alphanumeric characters of the symbol of the corresponding detection terminal 151 in FIG. 2 (for example, L1 of the first left detection terminal 151-L1).

In other words, the coefficient information values each correspond to different sets of one of the sections 112 and one of the detection terminals 151. Each of the coefficient information values represents a ratio of an amount of electric charge detected through the detection terminals 151 of a corresponding set to an amount of electric charge charged in the section 112 of the corresponding set.

A method of calculating a coefficient information value will be described with reference to FIGS. 5 to 8. In all tables illustrated in FIGS. 5 to 8, each column corresponds to an x coordinate illustrated in FIG. 2, and each row corresponds to a y coordinate illustrated in FIG. 2.

A horizontal area ratio table 161Y illustrated in FIGS. 5 and 6 represents a ratio of an area of the horizontal electrode 150-EY in one section 112 (in FIG. 2) contributing to capacitance to a total area of the electrodes 150 in the section 112 contributing to the capacitance. In the present embodiment, for every section 112, a ratio of an area of the horizontal electrode 150-EY is "0.5".

A vertical area ratio table 161X illustrated in FIGS. 7 and 8 represents a ratio of an area of the vertical electrode 150-EX in one section 112 (in FIG. 2) contributing to capacitance to a total area of the electrodes 150 in the section 112 contributing to the capacitance. In the present embodiment, for every section 112, a ratio of an area of the vertical electrode 150-EX is "0.5".

A left resistance ratio table 162L illustrated in FIG. 5 represents a ratio of an amount of electric charge flowing to the left detection terminal 151-L to an amount of electric charge charged in the horizontal electrode 150-EY of one section 112 illustrated in FIG. 2. A right resistance ratio table 162R illustrated in FIG. 6 represents a ratio of an amount of electric charge flowing to the right detection terminal 151-R out of an amount of electric charge charged in the horizontal electrode 150-EY of one section 112 illustrated in FIG. 2. An amount of electric charge in a section 112 flowing to the left detection terminal 151-L and an amount of electric charge in the section 112 flowing to the right detection terminal 151-R are determined based on a ratio of a resistance from the section 112 to the left detection terminal 151-L to a resistance from the section 112 to the right detection terminal 151-R.

In FIG. 2, a ratio of "a resistance from a certain section 112 to the left detection terminal 151-L" to "a resistance from the certain section 112 to the right detection terminal 151-R" is referred to as a horizontal resistance ratio. As a horizontal resistance ratio of coordinates (xa, ya) is approximately "0:1", a value of an element corresponding to the coordinates (xa, ya) in the left resistance ratio table 162L (FIG. 5) is 1/(0+1)="1", and a value of an element corresponding to the coordinates (xa, ya) in the right resistance ratio table 162R (FIG. 6) is 0/(0+1)="0". As a horizontal resistance ratio of coordinates (xb, ya) is approximately "1:3", a value of an element corresponding to the coordinates (xb, ya) in the left resistance ratio table 162L (FIG. 5) is 3/(1+3)="0.75", and a value of an element corresponding to the coordinates (xb, ya) in the right resistance ratio table 162R (FIG. 6) is 1/(1+3)="0.25". As a horizontal resistance ratio of coordinates (xc, ya) is approximately "1:1", a value of an element corresponding to the coordinates (xc, ya) in the left resistance ratio table 162L (FIG. 5) is 1/(1+1)="0.5", and a value of an element corresponding to the coordinates (xc, ya) in the right resistance ratio table 162R (FIG. 6) is 1/(1+1)="0.5". As a horizontal resistance ratio of coordinates (xd, ya) is approximately "3:1", a value of an element corresponding to the coordinates (xd, ya) in the left resistance ratio table 162L (FIG. 5) is 1/(3+1)="0.25", and a value of an element corresponding to the coordinates (xd, ya) in the right resistance ratio table 162R (FIG. 6) is 3/(3+1)="0.75". As a horizontal resistance ratio of coordinates (xe, ya) is approximately "1:0", a value of an element corresponding to the coordinates (xe, ya) in the left resistance ratio table 162L (FIG. 5) is 0/(1+0)="0", and a value of an element corresponding to the coordinates (xe, ya) in the right resistance ratio table 162R (FIG. 6) is 1/(1+0)="1".

In the left resistance ratio table 162L (FIG. 5), values of elements corresponding to sections 112 having the same x coordinate are all the same. In the right resistance ratio table 162R (FIG. 6), values of elements corresponding to sections 112 having the same x coordinate are all the same.

An upper resistance ratio table 162T illustrated in FIG. 7 represents a ratio of an amount of electric charge flowing to the top detection terminal 151-T to an amount of electric charge charged in the vertical electrode 150-EX of one section 112 illustrated in FIG. 2. A lower resistance ratio table 162B illustrated in FIG. 8 represents a ratio of an amount of electric charge flowing to the bottom detection terminal 151-B out of an amount of electric charge charged in the vertical electrode 150-EX of one section 112 illustrated in FIG. 2. An amount of electric charge in a section 112 flowing to the top detection terminal 151-T and an amount of electric charge in the section 112 flowing to the bottom detection terminal 151-B are determined based on a ratio of a resistance from the section 112 to the top detection terminal 151-T to a resistance from the section 112 to the bottom detection terminal 151-B.

In FIG. 2, a ratio of "a resistance from a certain section 112 to the top detection terminal 151-T" to "a resistance from the certain section 112 to the bottom detection terminal 151-B" is referred to as a vertical resistance ratio. As a vertical resistance ratio of coordinates (xa, ya) is approximately "0:1", a value of an element corresponding to the coordinates (xa, ya) in the upper resistance ratio table 162T (FIG. 7) is 1/(0+1)="1", and a value of an element corresponding to the coordinates (xa, ya) in the lower resistance ratio table 162B (FIG. 8) is 0/(0+1)="0". As a vertical resistance ratio of coordinates (xa, yb) is approximately "1:2", a value of an element corresponding to the coordinates (xa, yb) in the upper resistance ratio table 162T (FIG. 7) is 2/(1+2)="0.66", and a value of an element corresponding to the coordinates (xa, yb) in the lower resistance ratio table 162B (FIG. 8) is 1/(1+2)="0.34". As a vertical resistance ratio of coordinates (xa, yc) is approximately "2:1", a value of an element corresponding to the coordinates (xa, yc) in the upper resistance ratio table 162T (FIG. 7) is 1/(2+1)="0.34", and a value of an element corresponding to the coordinates (xa, yc) in the lower resistance ratio table 162B (FIG. 8) is 2/(2+1)="0.66". As a vertical resistance ratio of coordinates (xa, yd) is approximately "1:0", a value of an element corresponding to the coordinates (xa, yd) in the upper resistance ratio table 162T (FIG. 7) is 0/(1+0)="0", and a value of an element corresponding to the coordinates (xa, yd) in the lower resistance ratio table 162B (FIG. 8) is 1/(1+0)="1".

In the upper resistance ratio table 162T (FIG. 7), values of elements corresponding to sections 112 having the same y coordinate are all the same. In the lower resistance ratio table 162B (FIG. 8), values of elements corresponding to sections 112 having the same y coordinate are all the same.

A value of each element in a left coefficient table 163L illustrated in FIG. 5 is the coefficient information value, and the value can be obtained by multiplying, for each section 112 (that is, for each of the coordinates), a value in the horizontal area ratio table 161Y and a value in the left resistance ratio table 162L. As each value in the ya-row of the left coefficient table 163L corresponds to the first left detection terminal 151-L1, the values in the ya-row are each stored in rows of corresponding coordinates of the L1-column of the coefficient matrix A 160 (FIG. 4). As each value in the yb-row of the left coefficient table 163L corresponds to the second left detection terminal 151-L2, the values in the yb-row are each stored in rows of corresponding coordinates of the L2-column of the coefficient matrix A 160 (FIG. 4). As each value in the yc-row of the left coefficient table 163L corresponds to the third left detection terminal 151-L3, the values in the yc-row are each stored in rows of corresponding coordinates of the L3-column of the coefficient matrix A 160 (FIG. 4). As each value in the yd-row of the left coefficient table 163L corresponds to the fourth left detection terminal 151-L4, the values in the yd-row are each stored in rows of corresponding coordinates of the L4-column of the coefficient matrix A 160 (FIG. 4).

A value of each element in a right coefficient table 163R illustrated in FIG. 6 is the coefficient information value, and the value can be obtained by multiplying, for each section 112 (that is, for each of the coordinates), a value in the horizontal area ratio table 161Y and a value in the right resistance ratio table 162R. As each value in the ya-row of the right coefficient table 163R corresponds to the first right detection terminal 151-R1, the values in the ya-row are each stored in rows of corresponding coordinates of the R1-column of the coefficient matrix A 160 (FIG. 4). As each value in the yb-row of the right coefficient table 163R corresponds to the second right detection terminal 151-R2, the values in the yb-row are each stored in rows of corresponding coordinates of the R2-column of the coefficient matrix A 160 (FIG. 4). As each value in the yc-row of the right coefficient table 163R corresponds to the third right detection terminal 151-R3, the values in the yc-row are each stored in rows of corresponding coordinates of the R3-column of the coefficient matrix A 160 (FIG. 4). As each value in the yd-row of the right coefficient table 163R corresponds to the fourth right detection terminal 151-R4, the values in the yd-row are each stored in rows of corresponding coordinates of the R4-column of the coefficient matrix A 160 (FIG. 4).

A value of each element in an upper coefficient table 163T illustrated in FIG. 7 is the coefficient information value, and the value can be obtained by multiplying, for each section 112 (that is, for each of the coordinates), a value in the vertical area ratio table 161X and a value in the upper resistance ratio table 162T. As each value in the xa-column of the upper coefficient table 163T corresponds to the first top detection terminal 151-T1, the values in the xa-column are each stored in rows of corresponding coordinates of the T1-column of the coefficient matrix A 160 (FIG. 4). As each value in the xb-column of the upper coefficient table 163T corresponds to the second top detection terminal 151-T2, the values in the xb-column are each stored in rows of corresponding coordinates of the T2-column of the coefficient matrix A 160 (FIG. 4). As each value in the xc-column of the upper coefficient table 163T corresponds to the third top detection terminal 151-T3, the values in the xc-column are each stored in rows of corresponding coordinates of the T3-column of the coefficient matrix A 160 (FIG. 4). As each value in the xd-column of the upper coefficient table 163T corresponds to the fourth top detection terminal 151-T4, the values in the xd-column are each stored in rows of corresponding coordinates of the T4-column of the coefficient matrix A 160 (FIG. 4). As each value in the xe-column of the upper coefficient table 163T corresponds to the fifth top detection terminal 151-T5, the values in the xe-column are each stored in rows of corresponding coordinates of the T5-column of the coefficient matrix A 160 (FIG. 4).

A value of each element in a lower coefficient table 163B illustrated in FIG. 8 is the coefficient information value, and the value can be obtained by multiplying, for each section 112 (that is, for each of the coordinates), a value in the vertical area ratio table 161X and a value in the lower resistance ratio table 162B. As each value in the xa-column of the lower coefficient table 163B corresponds to the first bottom detection terminal 151-B1, the values in the xa-column are each stored in rows of corresponding coordinates of the B1-column of the coefficient matrix A 160 (FIG. 4). As each value in the xb-column of the lower coefficient table 163B corresponds to the second bottom detection terminal 151-B2, the values in the xb-column are each stored in rows of corresponding coordinates of the B2-column of the coefficient matrix A 160 (FIG. 4). As each value in the xc-column of the lower coefficient table 163B corresponds to the third bottom detection terminal 151-B3, the values in the xc-column are each stored in rows of corresponding coordinates of the B3-column of the coefficient matrix A 160 (FIG. 4). As each value in the xd-column of the lower coefficient table 163B corresponds to the fourth bottom detection terminal 151-B4, the values in the xd-column are each stored in rows of corresponding coordinates of the B4-column of the coefficient matrix A 160 (FIG. 4). As each value in the xe-column of the lower coefficient table 163B corresponds to the fifth bottom detection terminal 151-B5, the values in the xe-column are each stored in rows of corresponding coordinates of the B5-column of the coefficient matrix A 160 (FIG. 4).

Among elements in the coefficient matrix A 160 illustrated in FIG. 4, an element into which a value in the left coefficient table 163L, the right coefficient table 163R, the upper coefficient table 163T, or the lower coefficient table 163B is not stored, is referred to as an empty element, and "0" is stored in every empty element.

The method of calculating the coefficient information value can also be said in the following. Each of the coefficient information values is calculated by multiplication of a first value and a second value. In the following description, a detection terminal 151 belonging to a certain set of a section 112 and a detection terminal 151 is referred to as a target terminal, an electrode 150 including the target terminal is referred to as a target electrode, a detection terminal 151 other than the target terminal that is included in the target electrode is referred to as a non-target terminal, and a section 112 belonging to the certain set is referred to as a target section. The first value is obtained by dividing an area of a portion of the target electrode provided in the target section and not being shielded by other electrodes 150 (which is a portion contributing to generation of a detection value of the target section), by a total area of portions of one or more electrodes 150 that contribute to generation of a detection value of the target section. Each of the second values is defined like the following. In the following description, a resistance between the target section and the target terminal is referred to as a target resistance, and a resistance between the target section and the non-target terminal (one of the other detection terminals 151 in the target electrode) is referred as a non-target resistance. If multiple non-target terminals are present in the target electrode, a non-target resistance can be defined for each of the non-target terminals. For every non-target terminal, a relationship between a second value corresponding to the target section and the target terminal and a second value corresponding to the target section and the non-target terminal is defined as follows. If the target resistance is larger than the non-target resistance of the non-target terminal, a second value corresponding to the target section and the target terminal is smaller than a second value corresponding to the target section and the non-target terminals. If the target resistance is smaller than the non-target resistance of the non-target terminal, a second value corresponding to the target section and the target terminal is larger than a second value corresponding to the target section and the non-target terminal. A sum of second values corresponding to the target section is 1.

A specific example will be described below. Suppose a case in which a set of the section 112 corresponding to coordinates (xa, ya) illustrated in FIG. 2 (as the target section) and the first left detection terminal 151-L1 (as the target terminal) is selected. The coefficient information value of this set is calculated by multiplying an element corresponding to the coordinates (xa, ya) in the horizontal area ratio table 161Y (which is a first value), and an element corresponding to the coordinates (xa, ya) in the left resistance ratio table 162L (which is a second value). The first horizontal electrode 150-EY1 including the first left detection terminal 151-L1 corresponds to the target electrode.

The first value is obtained by dividing an area of a portion of the first horizontal electrode 150-EY1 (the target electrode) contributing to generation of a detection value of the target section, by a total area of portions of all electrodes 150 that contribute to generation of a detection value of the target section.

Next, resistance (the target resistance) between the target section and the target terminal and resistance (the non-target resistance) between the target section and one of the other detection terminals 151 in the first horizontal electrode 150-EY1 (target electrode) is compared. As mentioned in the above description about the left resistance ratio table 162L (FIG. 5) and the right resistance ratio table 162R (FIG. 6), a ratio of the target resistance to the non-target resistance (target resistance:non-target resistance) is "0:1". Because the target resistance is smaller than the non-target resistance, a second value corresponding to the target section and the target terminal (which is an element in the left resistance ratio table 162L of FIG. 5 corresponding to the coordinates (xa, ya)) is larger than a second value corresponding to the target section and the first right detection terminal 151-R1 (which is an element in the right resistance ratio table 162R of FIG. 6 corresponding to the coordinates (xa, ya)).

Conversely, in a case in which the first right detection terminal 151-R1 is a target terminal, and in which the first left detection terminal 151-L1 is one of the other detection terminals 151 in the target electrode, because the target resistance is larger than the non-target resistance, a second value (which is an element in the right resistance ratio table 162R of FIG. 6 corresponding to the coordinates (xa, ya)) corresponding to the target section and the first right detection terminal 151-R1 (the target terminal) is smaller than a second value (which is an element in the left resistance ratio table 162L of FIG. 5 corresponding to the coordinates (xa, ya)) corresponding to the target section and the first left detection terminal 151-L1 (one of the other detection terminals 151).

A sum of all the second values corresponding to the target section, which is a sum of the element in the right resistance ratio table 162R of FIG. 6 corresponding to the coordinates (xa, ya) and the element in the left resistance ratio table 162L of FIG. 5 corresponding to the coordinates (xa, ya), is 1.

(Image Data Calculation Method)

Figure 9:
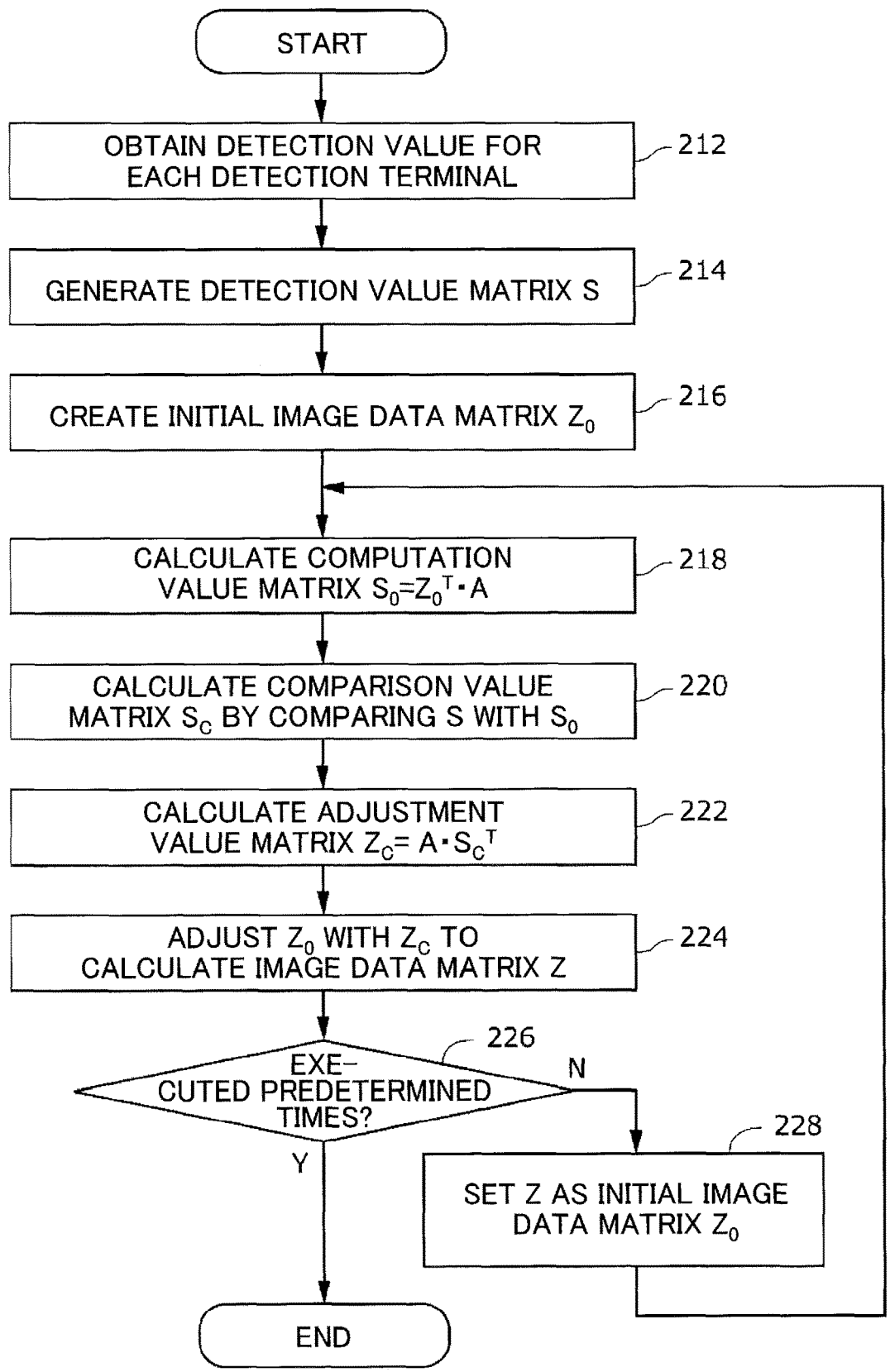
FIG. 9 is a flowchart illustrating an image data calculating method for the input device illustrated in FIG. 1.

FIG. 9 is a flowchart illustrating a method of calculating image data (hereinafter, which may also be referred to as an "image data calculation method"). In the following, the image data calculation method performed by the image data calculation unit 141 will be described with reference to the diagrams in FIGS. 1 and 2 and the flowchart in FIG. 9. In the following, in addition to a general description, specific values relevant to each other will be presented as an example. However, the present embodiment is not limited to the specific values to be presented below. FIG. 10 illustrates examples of matrices that are calculated or used when a calculation loop to be described below is executed once in the image data calculation method.

At step 212 in FIG. 9, for each of the detection terminals 151, the image data calculation unit 141 detects a detection value through the detection terminal 151, by controlling the detection circuit 120. The detection value varies in accordance with an amount of electric charge detected through the detection terminal 151. Here, an m number of detection values equivalent to the number of the detection terminals 151 are detected (m=18 in the present embodiment).

Subsequent to step 212 illustrated in FIG. 9, step 214 is performed. At step 214, the image data calculation unit 141 generates a detection value matrix S 173 with 1 row and m columns, consisting of the m number of detection values, as illustrated in FIG. 10. Each symbol described above the detection value matrix S 173 represents a correspondence between a column above which the symbol is described and the detection terminal 151 illustrated in FIG. 2, and is identified with the last two alphanumeric characters of the symbol of the corresponding detection terminal 151 (for example, L1 of the first left detection terminal 151-L1).

Subsequent to step 214 illustrated in FIG. 9, step 216 is performed. At step 216, the image data calculation unit 141 creates an initial image data matrix $Z_0$ 171 with n rows and 1 column, consisting of an n number of initial image data values, as illustrated in FIG. 10. The above described letter n represents the number of the sections 112, and a value of n is 20 in the present embodiment. Each symbol described at a left side of the initial image data matrix $Z_0$ 171 represents a correspondence between a row at which the symbol is described and the coordinates illustrated in FIG. 2.

The initial image data value is an image data value that is tentatively set to each of the sections 112, as image data before executing the calculation loop. When executing the calculation loop for the first time, the image data calculation unit 141 uses predetermined values as the initial image data values corresponding to the respective sections 112. The predetermined values are positive values. In the example described in the present embodiment, all the predetermined values are "1".

Subsequent to step 216 illustrated in FIG. 9, step 218 is performed. Steps 218 to 224 to be described below are referred to as the calculation loop. The image data calculation unit 141 calculates the multiple image data values by performing the calculation loop at least once. The image data calculation unit 141 may perform the calculation loop multiple times.

At step 218 illustrated in FIG. 9, the image data calculation unit 141 calculates multiple computation values representing detection values to be detected at the respective detection terminals 151, assuming that electric charge of a quantity corresponding to each of the initial image data values is charged in the respective sections 112 in accordance with a correspondence between the initial image data values and the sections 112. The calculating operation of the multiple computation values includes a calculating operation of calculating the multiple computation values based on the multiple coefficient information values.

Specifically, the calculating operation of the multiple computation values includes an operation of calculating a computation value matrix $S_0$ 172 with 1 row and m columns consisting of the m number of computation values, as illustrated in FIG. 10, by using a transposed matrix $Z_0^T$ of the initial image data matrix $Z_0$ 171 illustrated in FIG. 10 and the coefficient matrix A 160 illustrated in FIG. 4, in accordance with a formula of $S_0 = Z_0^T \cdot A$. Each symbol described above the columns of the computation value matrix $S_0$ 172 represents a correspondence between a column above which the symbol is described and the detection terminal 151 illustrated in FIG. 2.

Subsequent to step 218 illustrated in FIG. 9, step 220 is performed. At step 220, for each of the detection terminals 151, the image data calculation unit 141 calculates a comparison value based on a comparison between the computation value and the detection value. The operation of calculating the comparison value for each of the detection terminals 151 includes an operation of dividing the detection value by the computation value, for each of the detection terminals 151.

Specifically, the operation of calculating the comparison value for each of the detection terminals 151 includes an operation of calculating a comparison value matrix $S_C$ 174 with 1 row and m columns consisting of the m number of comparison values, as illustrated in FIG. 10. Each symbol described above the columns of the comparison value matrix $S_C$ 174 represents a correspondence between a column above which the symbol is described and the detection terminal 151 illustrated in FIG. 2. For each integer k not less than 1 and not more than m, an element of the k-th column of the comparison value matrix $S_C$ 174 is obtained by dividing an element of the k-th column of the detection value matrix S 173 by an element of the k-th column of the computation value matrix $S_0$ 172.

Subsequent to step 220 illustrated in FIG. 9, step 222 is performed. At step 222, for each of the sections 112, the image data calculation unit 141 calculates an adjustment value used for adjusting the initial image data value, based on the comparison values and the coefficient information values. When a set of all coefficient information values corresponding to a certain section 112 is referred to as a group of coefficient information, the operation of calculating an adjustment value corresponding to the certain section 112 includes an operation of calculating, for each of the detection terminals 151, a product of a corresponding coefficient value in the group of coefficient information and a corresponding comparison value, and an operation of calculating a sum of each of the products as the adjustment value. The adjustment value is a value obtained by converting a ratio of the detection value to the computation value into a ratio of the image data value to the initial image data value, using the coefficient information values.

Specifically, the operation of calculating the adjustment value for each of the sections 112 includes an operation of calculating an adjustment value matrix $Z_C$ 175 with n rows and 1 column consisting of the n number of adjustment values, as illustrated in FIG. 10, by using a transposed matrix $S_C^T$ of the comparison value matrix $S_C$ 174 illustrated in FIG. 10 and the coefficient matrix A 160 illustrated in FIG. 4, in accordance with a formula of $Z_C = A \cdot S_C^T$. Each symbol described at a left side of the adjustment value matrix $Z_C$ 175 represents a correspondence between a row at which the symbol is described and the coordinates illustrated in FIG. 2.

Subsequent to step 222 illustrated in FIG. 9, step 224 is performed. At step 224, for each of the sections 112, the image data calculation unit 141 calculates the image data value by adjusting the initial image data value based on the adjustment value. The operation of calculating the image data value for each of the sections 112 includes an operation of calculating, for each of the sections 112, the image data value by multiplying the adjustment value and the initial image data value.

Specifically, the operation of calculating the image data value for each of the sections 112 by adjusting the initial image data value based on the adjustment value includes an operation of calculating an image data matrix Z 176 with n rows and 1 column consisting of the n number of image data values, as illustrated in FIG. 10. Each symbol described at a left side of the image data matrix Z 176 represents a correspondence between a row at which the symbol is described and the coordinates illustrated in FIG. 2. The operation of calculating the image data value for each of the sections 112 by adjusting the initial image data value based on the adjustment value also includes an operation of obtaining an element of a p-th row of the image data matrix Z 176 by multiplying an element of the p-th row of the adjustment value matrix $Z_C$ 175 by an element of the p-th row of the initial image data matrix $Z_0$ 171, for all integers of p not less than 1 and not more than n.

Subsequent to step 224 illustrated in FIG. 9, step 226 is performed. At step 226, the image data calculation unit 141 determines whether the calculation loop has been executed for a predetermined number of times. An example of the predetermined number is 10. If it is determined that the calculation loop has been executed for the predetermined number of times, the image data calculation unit 141 terminates the image data calculation method. If it is determined that the calculation loop has not been executed for the predetermined number of times, the image data calculation unit 141 proceeds to step 228.

At step 228 illustrated in FIG. 9, for each of the sections 112, the image data calculation unit 141 sets the image data value calculated in the calculation loop as the initial image data value for the calculation loop to be executed next time. Specifically, the image data calculation unit 141 is configured such that the image data matrix Z 176 calculated at step 224 will be used by the calculation loop to be executed next time, instead of the initial image data matrix $Z_0$ 171. After step 228, step 218 is executed again. When the calculation loop is executed multiple times, as the comparison value gradually converges to 1, it is found that the image data value is getting closer to an actual value.

In another embodiment, the image data calculation unit 141 does not necessarily limit the number of executions of the calculation loop. Instead, the calculation loop may be executed for a certain period of time. Alternatively, in another embodiment, instead of limiting the number of executions of the calculation loop, the image data calculation unit 141 may repeat the execution of the calculation loop until a variation of the image data values becomes smaller than a threshold.

With respect to the image data matrix Z 176, the initial image data matrix $Z_0$ 171, and the adjustment value matrix $Z_0$ 175 illustrated in FIG. 10, elements in the same row correspond to a same section 112 with the same coordinates. With respect to the detection value matrix S 173, the computation value matrix $S_0$ 172, and the comparison value matrix $S_C$ 174, elements in the same column correspond to the same detection terminal 151. With respect to the coefficient matrix A 160 illustrated in FIG. 4 and the image data matrix Z 176 illustrated in FIG. 10, elements in the same row correspond to a same section 112 with the same coordinates. With respect to the coefficient matrix A 160 illustrated in FIG. 4 and the detection value matrix S 173 illustrated in FIG. 10, elements in the same column correspond to the same detection terminal 151.

(Example of Execution Result)

Figure 11:
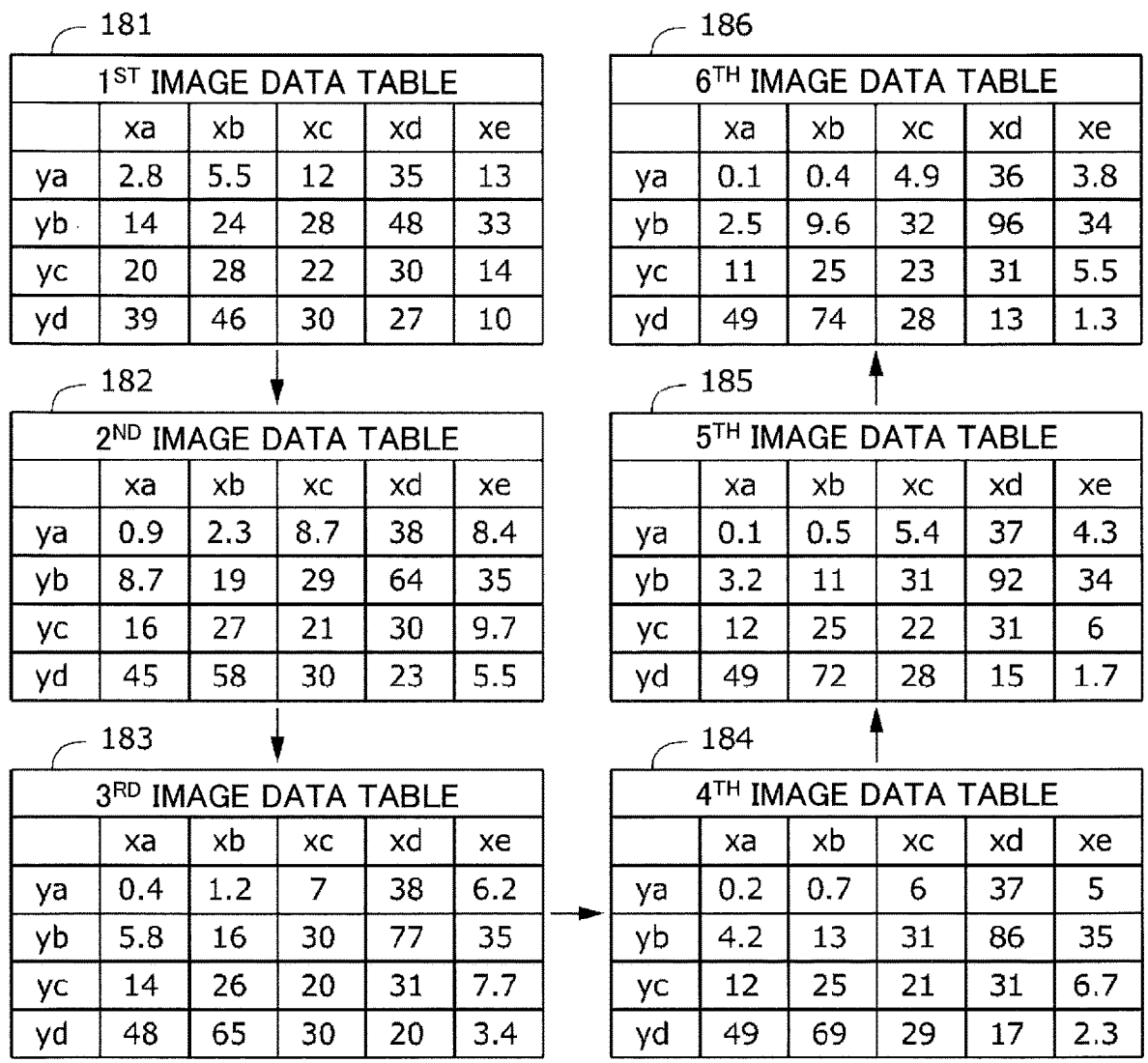
FIG. 11 is a diagram illustrating examples of image data values obtained by executing a calculation loop included in the image data calculating method in FIG. 9 multiple times.

FIG. 11 illustrates transition of the image data values when the calculation loop is executed multiple times in the example. At times when 1st, 2nd, 3rd, 4th, 5th, and 6th execution of the calculation loop are finished, a 1st image data table 181, a 2nd image data table 182, a 3rd image data table 183, a 4th image data table 184, a 5th image data table 185, and a 6th image data table 181 are created respectively. Each element in the 1st to 6th image data tables 181 to 186 represents an image data value of the section specified with an x coordinate corresponding to a column of the element and a y coordinate corresponding to a row of the element. By repeated execution of the calculation loop, the image data values converged, and variations of the image data values became smaller.

The input device 100 may detect the number of the operating bodies or coordinates of the operating body, by referring to the image data values.

Note that a shape of the electrode 150 in the section 112 is not limited to a rectangle, and may be of circular shape, or may be of other polygonal shapes. The electrode 150 may be a rhombus. Alternatively, the shape of the electrode 150 may be different in each section 112. The electrode 150 passing through multiple sections 112 may be integrally formed, or may be formed by connecting discrete electrodes with conducting members such as a wire or a resistor.

(Summary)

According to the present embodiment, the image data calculation unit 141 calculates image data values based on detection values detected at the detection terminals 151 and coefficient information values. Thus, different from a conventional case, even if electrodes 150 are not separate for each section 112, image data values can be calculated. Also, as compared to a conventional case in which electrodes 150 are separate for each section 112, the required number of wirings between the image data calculation unit 141 and the electrodes 150 becomes smaller. Therefore, image data values can be calculated in a simpler device configuration. That is, image data representing variation of capacitance between an operating body and the operation panel 111 at each point on the operation panel 111 can be accurately created with a smaller number of electrodes 150.

According to the present embodiment, by executing the calculation loop, the image data calculation unit 141 calculates a comparison value for each of the detection terminals 151 based on a comparison between a computation value and a detection value, and calculates image data values by adjusting initial image data values based on the computation values. Thus, as compared to a case in which initial image data values are blindly selected, the image data calculation unit 141 can cause the image data values to converge toward actual values, with less computational complexity. That is, by starting approximate computation using initial image data value tentatively determined, computational complexity of image data values becomes less than performing exact calculation. Further, by considering a difference between a computation value and a detection value, image data values of the sections 112 can be accurately calculated.

According to the present embodiment, because a computation value and an adjustment value are calculated based on coefficient information values each representing a ratio of an amount of electric charge detected at a corresponding detection terminal 151 of all detection terminals 151, to an amount of electric charge charged in a corresponding section 112 of all sections 112, image data values can be accurately calculated by reflecting actual physical flow of electric charge.

According to the present embodiment, because it is possible to perform approximate computation not using an inverse of a matrix, image data values can be accurately calculated with less computational complexity as compared to a case of performing exact calculation of an inverse of a matrix.

According to the present embodiment, because coefficient information values are calculated based on an area and a resistance value, image data values can be accurately calculated by reflecting actual physical structure.

According to the present embodiment, when executing the calculation loop for the first time, predetermined positive values are used as initial image data values corresponding to respective image data values. Thus, because solutions of image data values always become positive if detection values are positive, a case in which apparently incorrect solutions are obtained can be avoided when image data values are limited to positive values.

According to the present embodiment, because execution of the calculation loop is repeated multiple times, initial image data values can be made to converge toward actual values gradually, and image data values can be more accurately calculated.

The present invention is not limited to the above described embodiments. That is, a person having ordinary skills in the art may perform various changes, combinations, sub-combinations, or alterations to the elements in the above described embodiment, within the scope of the present invention and equivalents thereof.

What is claimed is:

1. An input device comprising:
an operation panel configured to receive an operation by at least one operating body located close to the operation panel;
one or more electrodes arranged along the operation panel and spaced from the operation panel; and
an image data calculation unit configured to calculate image data values, each of the image data values being calculated for a corresponding section of a plurality of sections defined on the operation panel virtually; wherein
in each of the plurality of sections, at least a portion of the one or more electrodes are arranged in proximity to part of the operation panel,
each of the image data values varies in accordance with an amount of electric charge charged in the corresponding section by a capacitance between the one or more electrodes in the corresponding section and the at least one operating body,
each of the one or more electrodes includes a plurality of detection terminals,
each of the plurality of detection terminals in said each of the one or more electrodes is connected to the image data calculation unit individually and separately, and
the image data calculation unit is configured
to detect, for each of the detection terminals, a detection value varying in accordance with an amount of electric charge detected through a corresponding detection terminal of the detection terminals, and
to calculate the image data values based on a plurality of coefficient information values, each of the coefficient information values corresponding to one set of different sets of one of the sections and one of the detection terminals, and the each of the coefficient information values representing a ratio of an amount of electric charge detected through the detection terminal of the one set to an amount of electric charge charged in the section of the one set.

2. The input device according to claim 1, the image data calculation unit being further configured to execute a calculation loop at least once to calculate the image data values, the calculation loop including
calculating, by using initial image data values corresponding to the respective sections, a plurality of computation values representing detection values to be detected at the respective detection terminals, assuming that electric charge of a quantity corresponding to the initial image data values is charged in the respective sections;
calculating, for each of the detection terminals, a comparison value based on a comparison between the computation value and the detection value;
calculating, for each of the sections, an adjustment value used for adjusting the initial image data value, based on the comparison values and the coefficient information values; and
calculating, for each of the sections, the image data value by adjusting the initial image data value based on the adjustment value;
wherein the image data calculation unit is configured to use predetermined values as the initial image data values when the image data calculation unit first executes the calculation loop.

3. The input device according to claim 2, wherein the calculating of the comparison value for each of the detection terminals includes an operation of dividing the detection value by the computation value, for each of the detection terminals,
the calculating of the adjustment value for a corresponding section includes an operation of calculating, for each of the detection terminals, a product of a corresponding coefficient value in a group of coefficient information consisting of all coefficient information values for the corresponding section and a corresponding comparison value, and an operation of calculating a sum of each of the products as the adjustment value, and
the calculating of the image data value for each of the sections includes an operation of multiplying the adjustment value and the initial image data value for each of the sections, to calculate the image data.

4. The input device according to claim 2, wherein, in a case in which
a number of the sections is n,
a number of the detection terminals is m,
n numbers of the image data values are expressed as a matrix Z with n rows and 1 column,
n numbers of the initial image data values are expressed as a matrix $Z_0$ with n rows and 1 column,
n numbers of the adjustment values are expressed as a matrix $Z_c$ with n rows and 1 column,
m numbers of the detection values are expressed as a matrix S with 1 row and in columns,
m numbers of the computation values are expressed as a matrix $S_0$ with 1 row and m columns,
m numbers of the comparison values are expressed as a matrix $S_c$ with 1 row and m columns,
each element of a same row in the matrix Z, the matrix $Z_0$, and the matrix $Z_c$ corresponds to a same one of the sections,
each element of a same column in the matrix 5, the matrix $S_0$, and the matrix $S_c$ corresponds to a same one of the detection terminals, the image data calculation unit is configured to use a coefficient matrix A with n rows and m columns consisting of the coefficient information values, each element of a same column in the coefficient matrix A and the matrix S corresponds to a same one of the detection terminals, each element of a same row in the matrix Z and the coefficient matrix A corresponds to a same one of the sections, and for all p and all k (p is an integer not smaller than 1 and not larger than n, and k is an integer not smaller than 1 and not larger than m), an entry in a p-th row and k-th column of the coefficient matrix A represents a ratio of an amount of electric charge detected by the detection terminal corresponding to the k-th column to an amount of electric charge charged in the section corresponding to the p-th row;

the calculating of the plurality of computation values includes an operation of calculating $S_0 = Z_0^T \cdot A$, where $Z_0^T$ is a transposed matrix of the matrix $Z_0$, the calculating of the comparison value for each of the detection terminals includes an operation of, for all k not less than 1 and not more than m, obtaining an element of the k-th column of the matrix $S_c$ by dividing an element of the k-th column of the matrix S by an element of the k-th column of the matrix $S_0$, the calculating of the adjustment value for each of the sections includes an operation of calculating $Z_C = A \cdot S_C^T$, where $S_C^T$ is a transposed matrix of the matrix $S_c$, and the calculating of the image data value for each of the sections, by adjusting the initial image data value based on the adjustment value, includes an operation of, for all p not less than 1 and not more than n, obtaining an element of the p-th row of the matrix Z by multiplying an element of the p-th row of the matrix $Z_0$ by an element of the p-th row of the matrix $Z_c$.

5. The input device according to claim 2, wherein the predetermined values used as the initial image data values when the image data calculation unit first executes the calculation loop are positive.

6. The input device according to claim 2, wherein the image data calculation unit is configured to execute the calculation loop multiple times, and to use, for each of the sections, the calculated image data values as the initial image data values for a next iteration of the image data calculation unit executing the calculation loop.

7. The input device according to claim 1, the each of the coefficient information values being obtained by multiplication of a first value and a second value;

wherein, in a case in which a target terminal is the detection terminal belonging to one of the sets, a target electrode is the electrode including the target terminal, and a target section is the section belonging to the one of the sets, the first value is obtained by dividing an area of a portion of the target electrode in the target section that contributes to generation of the detection value of the target section, by a total area of portions of the at least one electrode that contributes to generation of the detection value of the target section, and the second value is defined, when a target resistance, which is a resistance between the target section and the target terminal, is compared with a non-target resistance, which is a resistance between the target section and one of other detection terminals in the target electrode, for all of the detection terminals in the target electrode, such that the second value corresponding to the target section and the target terminal is smaller than a second value corresponding to the target section and the one of the other detection terminals for the target resistance being larger than the non-target resistance, the second value corresponding to the target section and the target terminal is larger than the second value corresponding to the target section and the one of the other detection terminals for the target resistance being smaller than the non-target resistance, and a sum of all of the second values corresponding to the target section is 1.

8. The input device according to claim 1, wherein the input device further comprises a detection device configured to detect, at each of the detection terminals, capacitance between each of the one or more electrodes in the corresponding section and the at least one operating body.

9. A method of calculating image data performed in an input device including an operation panel configured to receive an operation by at least one operating body located close to the operation panel;

one or more electrodes arranged along the operation panel and spaced from the operation panel; and an image data calculation unit configured to calculate image data values, each of the image data values being calculated for a corresponding section of a plurality of sections defined on the operation panel virtually; wherein in each of the plurality of sections, at least a portion of the one or more electrodes are arranged in proximity to part of the operation panel;

each of the image data values varies in accordance with an amount of electric charge charged in the corresponding section by a capacitance between the one or more electrodes in the corresponding section and the at least one operating body;

each of the one or more electrodes includes a plurality of detection terminals;

each of the plurality of detection terminals in said each of the one or more electrodes is connected to the image data calculation unit individually and separately; and the method comprises:

detecting, for each of the detection terminals, a detection value varying in accordance with an amount of electric charge detected through a corresponding detection terminal of the detection terminals, and calculating the image data values based on a plurality of coefficient information values, each of the coefficient information values corresponding to one set of different sets of one of the sections and one of the detection terminals, and the each of the coefficient information values representing a ratio of an amount of electric charge detected through the detection terminal of the one set to an amount of electric charge charged in the section of the one set.

10. A non-transitory computer-readable recording medium storing a computer program to cause a processor in a computer to execute the method of calculating image data according to claim 9.

* * * * *